(12) United States Patent
Yang et al.

(10) Patent No.: US 10,652,911 B2
(45) Date of Patent: May 12, 2020

(54) METHOD FOR DROPPING COMMUNICATION BASED ON PRIORITY BY WIRELESS DEVICE SUPPORTING WAN COMMUNICATION AND V2X COMMUNICATION AND, THE WIRELESS DEVICE PERFORMING THE METHOD

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

(21) Appl. No.: 15/786,505

(22) Filed: Oct. 17, 2017

(65) Prior Publication Data

US 2018/0124808 A1    May 3, 2018

Related U.S. Application Data

(60) Provisional application No. 62/416,172, filed on Nov. 2, 2016.

(51) Int. Cl.
*H04W 72/12* (2009.01)
*H04W 72/04* (2009.01)
(Continued)

(52) U.S. Cl.
CPC ......... *H04W 72/1215* (2013.01); *H04L 67/12* (2013.01); *H04W 72/02* (2013.01);
(Continued)

(58) Field of Classification Search
CPC ............ H04W 72/1215; H04W 72/02; H04W 72/0446; H04W 72/048; H04W 4/21;
(Continued)

(56) References Cited

U.S. PATENT DOCUMENTS 8,526,310 B2 * 9/2013 Dinan ............... H04W 56/0005
                                                      370/236
8,654,688 B2 * 2/2014 Lim ......................... H04L 5/14
                                                      370/281

(Continued)

*Primary Examiner* — Huy D Vu
*Assistant Examiner* — Bailor C. Hsu
(74) *Attorney, Agent, or Firm* — Lee Hong Degerman Kang & Waimey

(57) ABSTRACT

There is provided a method for transmitting data by a wireless device configured to support WAN communication and V2X communication, the method comprising scheduling a first data transmission to be performed in an N-th subframe, wherein the first transmission uses the WAN communication; scheduling a second data transmission to be performed in an (N−1)-th subframe, wherein the second transmission uses the V2X communication, wherein the (N−1)-th subframe for the second transmission is offset from the N-th subframe by a DFN (Direct Frame Number) offset; determining which one of the first transmission or the second transmission to be dropped, based on a priority between the WAN and V2X communications, wherein the determining is further based on comparison between a length of a last symbol in the (N−1)-th subframe for the second transmission with a length of the DFN offset.

10 Claims, 17 Drawing Sheets

(51) Int. Cl.
*H04L 29/08* (2006.01)
*H04W 72/02* (2009.01)
*H04W 88/06* (2009.01)
*H04W 4/21* (2018.01)

(52) U.S. Cl.
CPC ..... *H04W 72/048* (2013.01); *H04W 72/0446*
(2013.01); *H04W 4/21* (2018.02); *H04W*
*72/1242* (2013.01); *H04W 72/1247* (2013.01);
*H04W 88/06* (2013.01)

(58) Field of Classification Search
CPC ......... H04W 72/1242; H04W 72/1247; H04W
88/06; H04L 67/12
See application file for complete search history.

(56) References Cited

U.S. PATENT DOCUMENTS

| | | | | |
|---|---|---|---|---|
| 9,337,980 | B2* | 5/2016 | Ahn | H04W 52/146 |
| 9,380,536 | B2* | 6/2016 | Mohan | H04W 52/0251 |
| 9,907,056 | B2* | 2/2018 | Bagheri | H04W 72/0413 |
| 2011/0128883 | A1* | 6/2011 | Chung | H04B 7/155 |
| | | | | 370/252 |
| 2016/0014706 | A1* | 1/2016 | Vajapeyam | H04W 56/001 |
| | | | | 370/328 |
| 2016/0095074 | A1* | 3/2016 | Park | H04W 8/005 |
| | | | | 370/350 |
| 2016/0285935 | A1* | 9/2016 | Wu | H04W 4/90 |
| 2017/0086028 | A1* | 3/2017 | Hwang | H04W 4/027 |
| 2017/0231006 | A1* | 8/2017 | Yin | H04W 74/0816 |

* cited by examiner

METHOD FOR DROPPING COMMUNICATION BASED ON PRIORITY BY WIRELESS DEVICE SUPPORTING WAN COMMUNICATION AND V2X COMMUNICATION AND, THE WIRELESS DEVICE PERFORMING THE METHOD

CROSS-REFERENCE TO RELATED APPLICATIONS

Pursuant to 35 U.S.C. § 119(e), this application claims the benefit of U.S. Provisional Patent Application No. 62/416,172, filed on Nov. 2, 2016, the contents of which are hereby incorporated by reference herein in its entirety.

BACKGROUND OF THE INVENTION

Field of the Present Disclosure

The present disclosure relates to wireless communication. More particularly, the present disclosure relates to dropping one of WAN communication and V2X communication based on priority therebetween by the wireless device supporting the WAN communication and V2X communication when the WAN communication and V2X communication overlap with each other.

Discussion of the Related Art $3^{rd}$ generation partnership project (3GPP) long term evolution (LTE) evolved from the universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

In LTE/LTE-A, physical channels for LTE may be classified into downlink channels, that is, a physical downlink shared channel (PDSCH) and a physical downlink control channel (PDCCH), and uplink channels, that is, a physical uplink shared channel (PUSCH) and a physical uplink control channel (PUCCH).

There is a need for communication between pieces of UE located at a physically close distance, that is, device to device (D2D) communication, due to an increase of user needs for social network service (SNS).

D2D communication may be performed between pieces of UE located in coverage of a base station or may be performed between pieces of UE located out of coverage of the base station. Furthermore, D2D communication may be performed between UE located out of coverage of a base station and UE located in coverage of the base station.

Contents regarding D2D may be applied to vehicle-to-everything (V2X). V2X generally refers to a communication technology through a vehicle and all of interfaces. An implementation form of V2X may be various, such as vehicle-to-vehicle (V2V), vehicle-to-infrastructure (V2I), vehicle-to-person (V2P), and vehicle-to-network (V2N).

Thus, there is required a protocol to drop one of a WAN communication and the V2X communication based on priority therebetween by the wireless device supporting the WAN communication and V2X communication when the WAN communication and V2X communication overlap with each other.

SUMMARY

Accordingly, an object of the present disclosure is to solve the above-mentioned problems.

In a first aspect of the present disclosure, there is provided a method for transmitting data by a wireless device, wherein the device is configured to support both of wide area network (WAN) communication and V2X (vehicle-to-X) communication, wherein the method comprises scheduling, by the device, a first data transmission to be performed in an N-th subframe, wherein the first transmission uses the WAN communication; scheduling, by the device, a second data transmission to be performed in an (N−1)-th subframe, wherein the second transmission uses the V2X communication, wherein the (N−1)-th subframe for the second transmission is offset from the N-th subframe for the first transmission by a DFN (Direct Frame Number) offset; determining, by the device, which one of the first transmission or the second transmission to be dropped, based on a priority between the WAN communication and V2X communication, wherein determining which one of the first transmission or the second transmission to be dropped is further based on comparison between a length of a last symbol in the (N−1)-th subframe for the second transmission with a length of the DFN offset.

In one embodiment of the first aspect, determining which one of the first transmission or the second transmission to be dropped includes determining that the second transmission is dropped when the WAN communication has a higher priority than the V2X communication, and the length of the DFN offset is greater than the length of the last symbol in the (N−1)-th subframe for the second transmission.

In one embodiment of the first aspect, determining which one of the first transmission or the second transmission to be dropped includes determining that the second transmission is not dropped when the WAN communication has a higher priority than the V2X communication, and the length of the DFN offset is smaller than or equal to the length of the last symbol in the (N−1)-th subframe for the second transmission.

In one embodiment of the first aspect, determining which one of the first transmission or the second transmission to be dropped includes determining that the first transmission is dropped when the V2X communication has a higher priority than the WAN communication, and the length of the DFN offset is greater than the length of the last symbol in the (N−1)-th subframe for the second transmission.

In one embodiment of the first aspect, determining which one of the first transmission or the second transmission to be dropped includes determining that the first transmission is not dropped when the V2X communication has a higher priority than the WAN communication, and the length of the DFN offset is smaller than or equal to the length of the last symbol in the (N−1)-th subframe for the second transmission.

In one embodiment of the first aspect, determining which one of the first transmission or the second transmission to be dropped is further based on comparison between a maximum power for the wireless device and a first power for the first transmission via the WAN communication or a second power for the second transmission via the V2X communication.

In one embodiment of the first aspect, determining which one of the first transmission or the second transmission to be dropped includes determining that the second transmission is dropped when the WAN communication has a higher priority than the V2X communication, and the length of the DFN offset is greater than the length of the last symbol in the (N−1)-th subframe for the second transmission, wherein the first power for the first transmission via the WAN communication is greater than or equal to the maximum power for the wireless device.

In one embodiment of the first aspect, wherein determining which one of the first transmission or the second transmission to be dropped includes determining that the first transmission is dropped when the V2X communication has a higher priority than the WAN communication, and the length of the DFN offset is greater than the length of the last symbol in the (N−1)-th subframe for the second transmission, the second power for the second transmission via the V2X communication is greater than or equal to the maximum power for the wireless device.

In a second aspect of the present disclosure, there is provided a wireless device configured to support both of wide area network (WAN) communication and V2X (vehicle-to-X) communication, wherein the device comprises: a RF unit configured to transmit data using the WAN communication and the V2X communication; and a processor configured for controlling the RF unit, wherein the processor is configured: to schedule a first data transmission to be performed in an N-th subframe, wherein the first transmission uses the WAN communication; to schedule a second data transmission to be performed in an (N−1)-th subframe, wherein the second transmission uses the V2X communication, wherein the (N−1)-th subframe for the second transmission is offset from the N-th subframe for the first transmission by a DFN (Direct Frame Number) offset; to determine which one of the first transmission or the second transmission to be dropped, based on a priority between the WAN communication and V2X communication, wherein the processor is further configured to determine which one of the first transmission or the second transmission to be dropped based on comparison between a length of a last symbol in the (N−1)-th subframe for the second transmission with a length of the DFN offset.

In one embodiment of the second aspect, the processor is further configured to determine that the second transmission is dropped when the WAN communication has a higher priority than the V2X communication, and the length of the DFN offset is greater than the length of the last symbol in the (N−1)-th subframe for the second transmission.

In one embodiment of the second aspect, the processor is further configured to determine that the second transmission is not dropped when the WAN communication has a higher priority than the V2X communication, and the length of the DFN offset is smaller than or equal to the length of the last symbol in the (N−1)-th subframe for the second transmission.

In one embodiment of the second aspect, the processor is further configured to determine that the first transmission is dropped when the V2X communication has a higher priority than the WAN communication, and the length of the DFN offset is greater than the length of the last symbol in the (N−1)-th subframe for the second transmission.

In one embodiment of the second aspect, the processor is further configured to determine that the first transmission is not dropped when the V2X communication has a higher priority than the WAN communication, and the length of the DFN offset is smaller than or equal to the length of the last symbol in the (N−1)-th subframe for the second transmission.

In one embodiment of the second aspect, the processor is further configured to determine which one of the first transmission or the second transmission to be dropped further based on comparison between a maximum power for the wireless device and a first power for the first transmission via the WAN communication or a second power for the second transmission via the V2X communication.

In one embodiment of the second aspect, wherein the processor is further configured to determine that the second transmission is dropped when the WAN communication has a higher priority than the V2X communication, and the length of the DFN offset is greater than the length of the last symbol in the (N−1)-th subframe for the second transmission, wherein the first power for the first transmission via the WAN communication is greater than or equal to the maximum power for the wireless device.

In one embodiment of the second aspect, wherein the processor is further configured to determine that the first transmission is dropped when the V2X communication has a higher priority than the WAN communication, and the length of the DFN offset is greater than the length of the last symbol in the (N−1)-th subframe for the second transmission, wherein the second power for the second transmission via the V2X communication is greater than or equal to the maximum power for the wireless device.

Thus, there may be provided a protocol to drop one of the WAN communication and the V2X communication based on priority therebetween by the wireless device supporting the WAN communication and V2X communication when the WAN communication and V2X communication overlap with each other.

DETAILED DESCRIPTIONS

Figure 1:
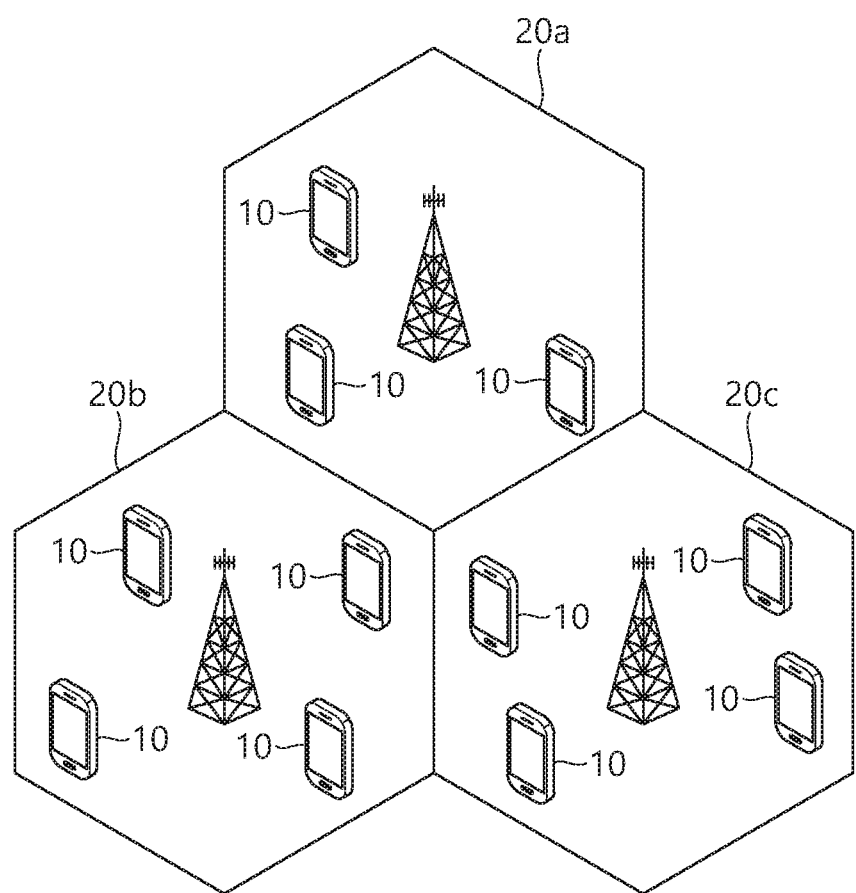
FIG. 1 is a wireless communication system.

Hereinafter, based on 3rd Generation Partnership Project (3GPP) long term evolution (LTE) or 3GPP LTE-advanced (LTE-A), the present disclosure will be applied. This is just an example, and the present disclosure may be applied to various wireless communication systems. Hereinafter, LTE includes LTE and/or LTE-A.

The technical terms used herein are used to merely describe specific embodiments and should not be construed as limiting the present disclosure. Furthermore, the technical terms used herein should be, unless defined otherwise, interpreted as having meanings generally understood by those skilled in the art but not too broadly or too narrowly. Furthermore, the technical terms used herein, which are determined not to exactly represent the spirit of the disclosure, should be replaced by or understood by such technical terms as being able to be exactly understood by those skilled in the art. Furthermore, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term "include" or "have" may represent the presence of a feature, a number, a step, an operation, an element, a part or a combination thereof described in the present disclosure, and may not exclude the presence or addition of another feature, another number, another step, another operation, another element, another part or the combination thereof.

The terms "first" and "second" are used for the purpose of explanation about various elements, and the elements are not limited to the terms "first" and "second". The terms "first" and "second" are only used to distinguish one element from another element. For example, a first element may be named as a second element without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same elements throughout the drawings, and repetitive description on the same elements will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

As used herein, a "base station" commonly refers to a fixed station that communicates with a wireless device and may be denoted as another term, such as an evolved-NodeB (eNB), a base transceiver system (BTS) or an access point.

As used herein, "user equipment (UE)" may be stationary or mobile, and may be denoted as another term, such as a device, a wireless device, a terminal, a mobile station (MS), a user terminal (UT), a subscriber station (SS), or a mobile terminal (MT).

FIG. 1 illustrates a wireless communication system.

As seen with reference to FIG. 1, the wireless communication system includes at least one base station (BS) 20. Each base station 20 provides a communication service to specific geographical areas (commonly referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
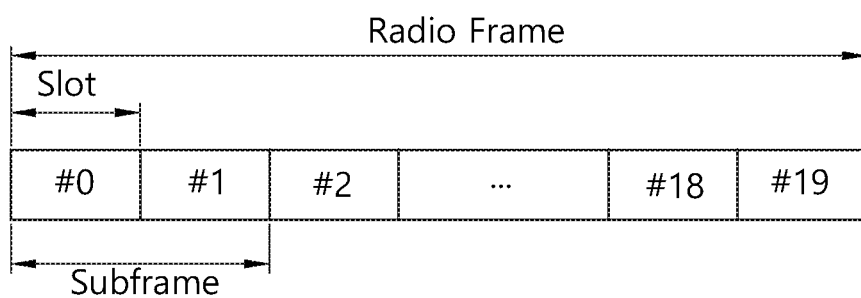
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame includes 10 subframes indexed 0 to 9. One subframe includes two consecutive slots. Accordingly, the radio frame includes 20 slots. The time taken for one subframe to be transmitted is called a transmission time interval (TTI). For example, the length of one subframe may be 1 ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
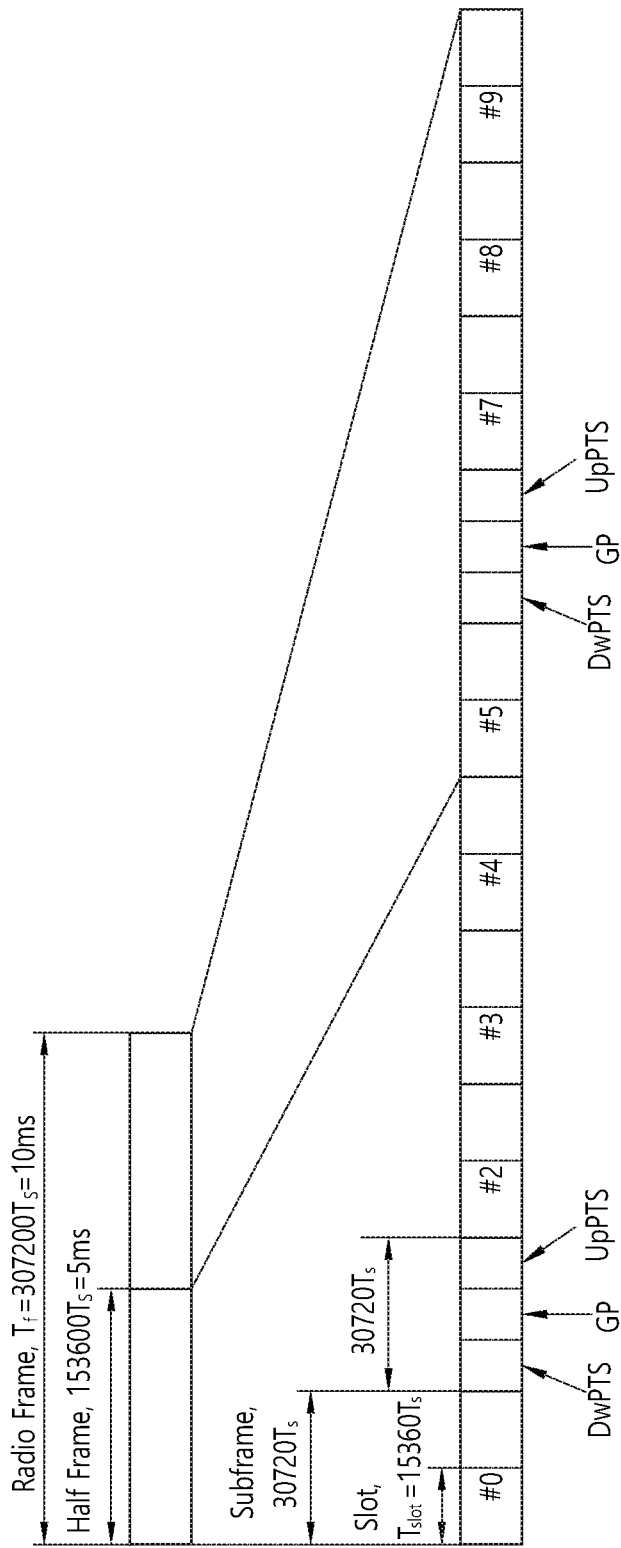
FIG. 3 illustrates a structure of a downlink radio frame according to TDD in the 3GPP LTE.

FIG. 3 illustrates the architecture of a downlink radio frame according to TDD in 3GPP LTE.

Sub-frames having index #1 and index #6 are denoted special subframes, and include a downlink pilot time slot (DwPTS), a guard period (GP) and an uplink pilot time slot (UpPTS). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a downlink (DL) subframe and an uplink (UL) subframe coexist in one radio frame. Table 1 shows an example of the configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In TDD, a DL (downlink) subframe and a UL (Uplink) co-exist in one radio frame. Table 1 shows an example of configuration of a radio frame.

"D" denotes a DL subframe, "U" is a UL subframe, and "S" is a special subframe. When receiving a UL-DL configuration from a base station, a terminal may be aware whether a subframe is a DL subframe or a UL subframe based on the configuration of a radio frame.

Figure 4:
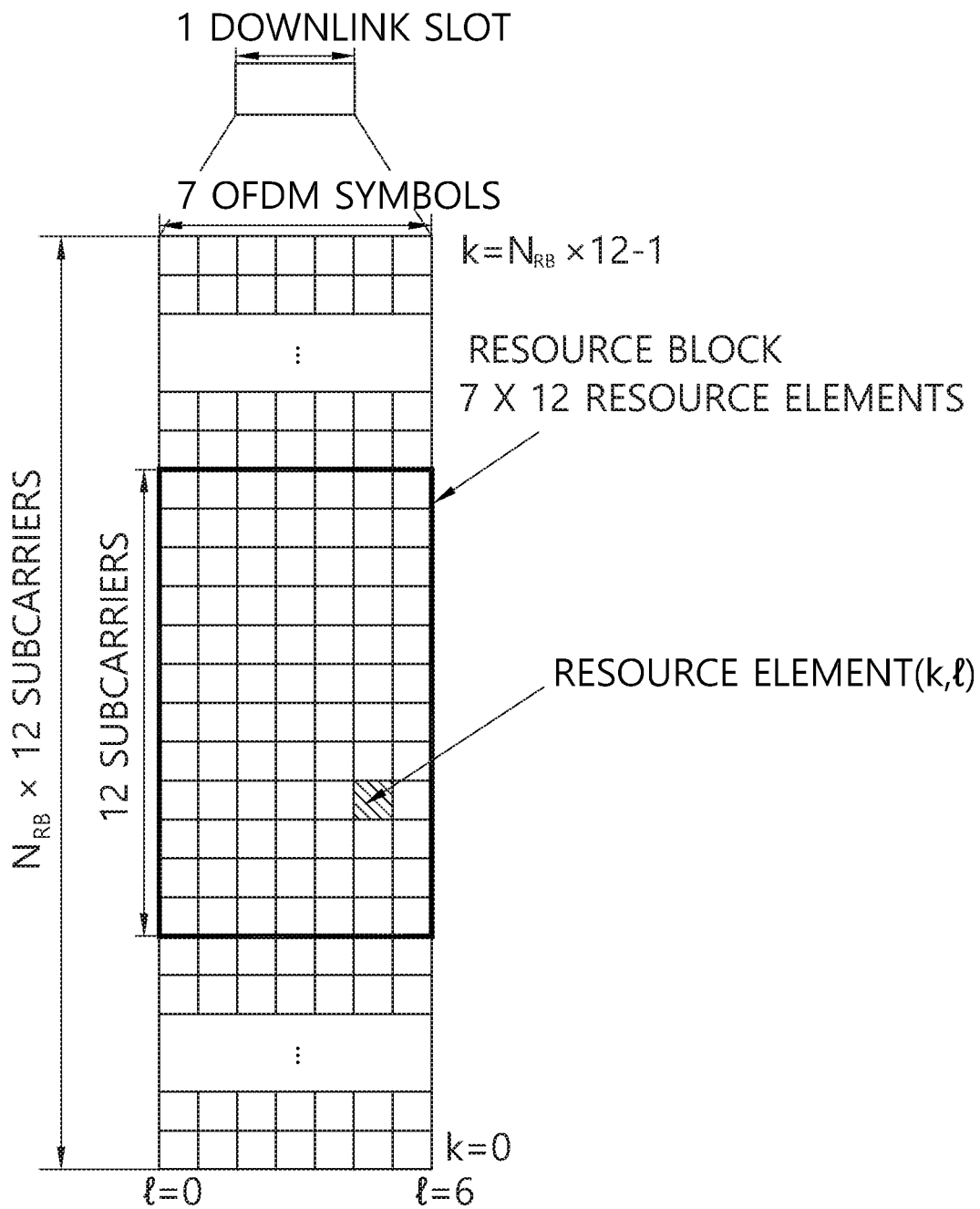
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of orthogonal frequency division multiplexing (OFDM) symbols in the time domain and N resource blocks (NRBs) in the frequency domain. For example, in the LTE system, the number of resource blocks (RBs), i.e., NRBs, may be one of 6 to 110.

The RB is a unit of resource allocation and includes a plurality of sub-carriers in the frequency domain. For example, if one slot includes seven OFDM symbols in the time domain and the RB includes 12 sub-carriers in the frequency domain, one RB may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
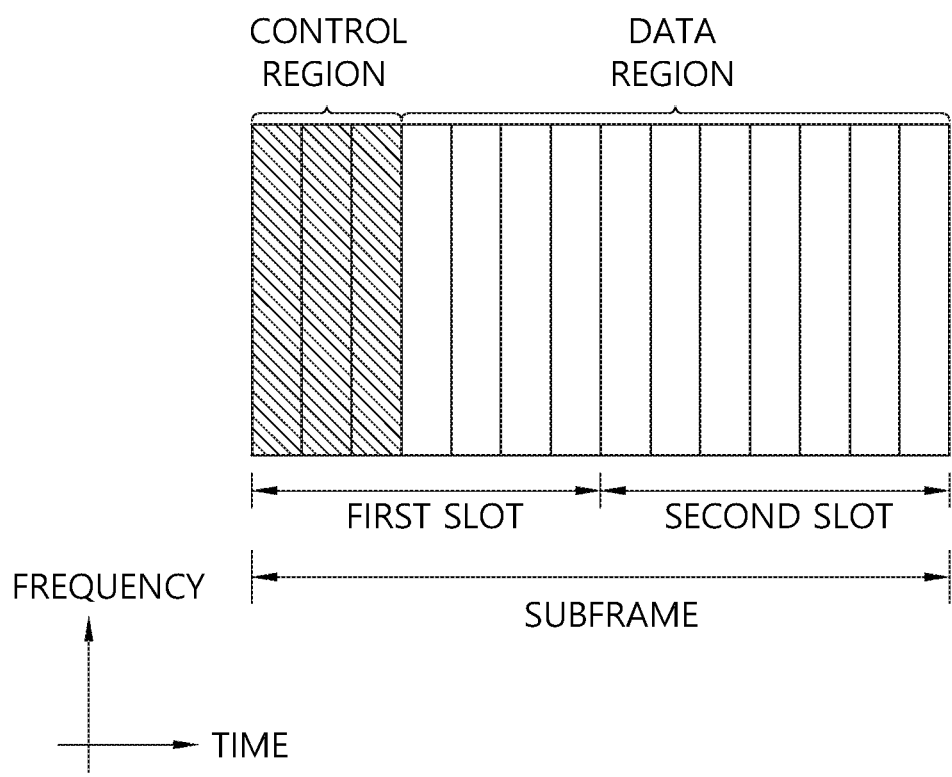
FIG. 5 illustrates a structure of a downlink subframe.

FIG. 5 illustrates the architecture of a downlink subframe.

In FIG. 5, assuming the normal CP, one slot includes seven OFDM symbols, by way of example.

The DL subframe is split into a control region and a data region in the time domain. The control region includes up to first three OFDM symbols in the first slot of the subframe. However, the number of OFDM symbols included in the control region may be changed. A physical downlink control channel (PDCCH) and other control channels are assigned to the control region, and a PDSCH is assigned to the data region.

In 3GPP LTE, physical channels may be classified into data channels, such as a physical downlink shared channel (PDSCH) and a physical uplink shared channel (PUSCH), and control channels, such as a physical downlink control channel (PDCCH), a physical control format indicator channel (PCFICH), a physical hybrid-ARQ indicator channel (PHICH), and a physical uplink control channel (PUCCH).

Figure 6:
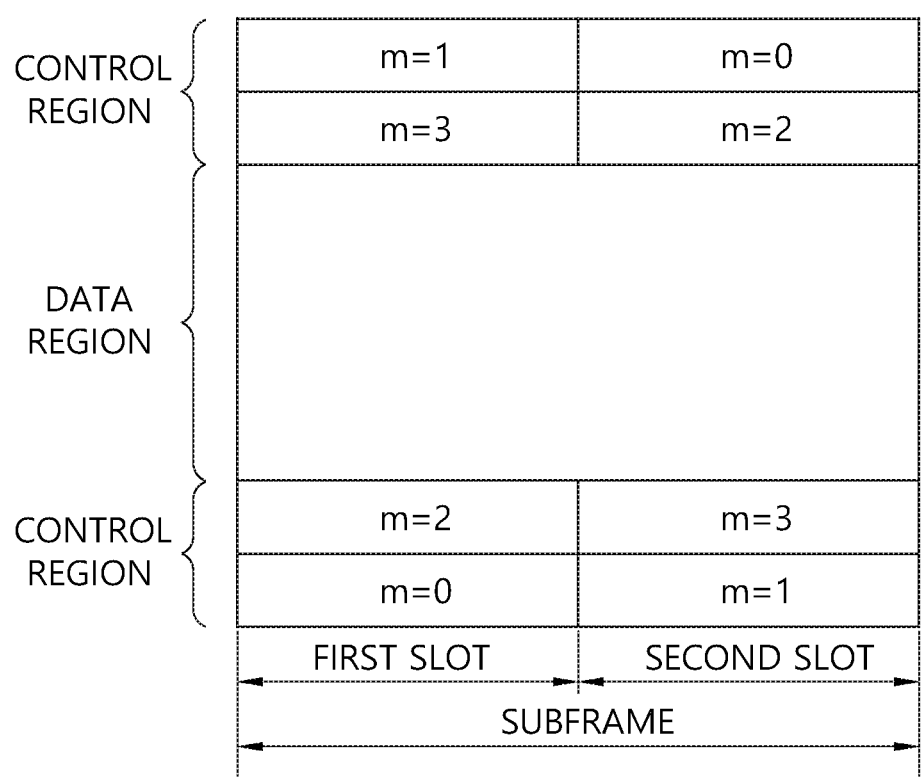
FIG. 6 illustrates the architecture of an uplink subframe in 3GPP LTE.

FIG. 6 illustrates the architecture of an uplink subframe in 3GPP LTE.

Referring to FIG. 6, the uplink subframe may be separated into a control region and a data region in the frequency domain. The control region is assigned a PUCCH for transmission of uplink control information. The data region is assigned a PUSCH for transmission of data (in some cases, control information may also be transmitted).

The PUCCH for one terminal is assigned in a resource block (RB) pair in the subframe. The resource blocks in the resource block pair take up different sub-carriers in each of

TABLE 2

| | Normal CP in downlink | | | Extended CP in downlink | | |
|---|---|---|---|---|---|---|
| | | UpPTS | | | UpPTS | |
| Special subframe configuration | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | | the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the subframe.

The uplink control information transmitted on the PUCCH includes a hybrid automatic repeat request (HARQ), acknowledgement (ACK)/non-acknowledgement (NACK), a channel quality indicator (CQI) indicating a downlink channel state, and a scheduling request (SR) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Alternatively, the uplink data may be multiplexed data. The multiplexed data may be data obtained by multiplexing the transport block for the UL-SCH and control information. For example, the control information multiplexed with the data may include a CQI, a precoding matrix indicator (PMI), an HARQ, and a rank indicator (RI). Alternatively, the uplink data may include only of control information.

<Carrier Aggregation (CA)>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Furthermore, in carrier aggregation, cells may be divided into a primary cell, a secondary cell, and a serving cell. A primary cell denotes a cell operating at a primary frequency, in which UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

As described above, the carrier aggregation system may support a plurality of component carriers (CCs), that is, a plurality of serving cells, unlike a single carrier system.

The carrier aggregation system may support cross-carrier scheduling. Cross-carrier scheduling is a scheduling method for performing resource allocation for a PDSCH transmitted through a different component carrier through a PDCCH transmitted through a specific component carrier and/or resource allocation for a PUSCH transmitted through a component carrier different from a component carrier basically linked with the specific component carrier.

<Device to Device (D2D) Communication>

D2D communication which is expected to be introduced into a next-generation communication system is described below.

Figure 7:
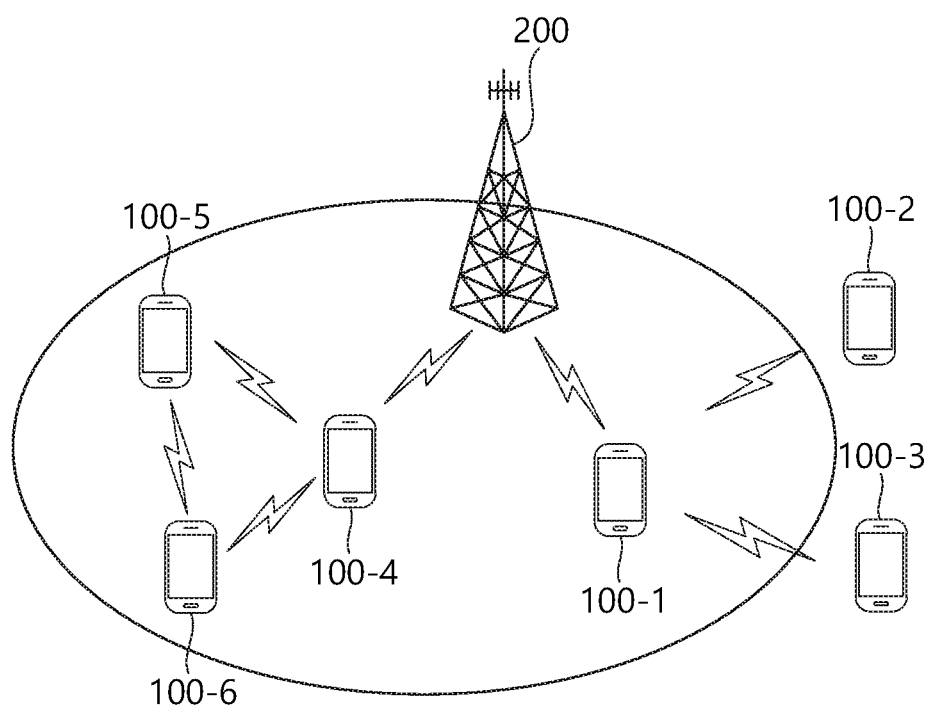
FIG. 7 shows the concept of device to device (D2D) communication which is expected to be introduced into a next-generation communication system.

FIG. 7 shows the concept of device to device (D2D) communication which is expected to be introduced into a next-generation communication system.

There is a need for communication between pieces of UE located at a physically close distance, that is, device to device (D2D) communication, due to an increase of user needs for social network service (SNS).

Figure 8:
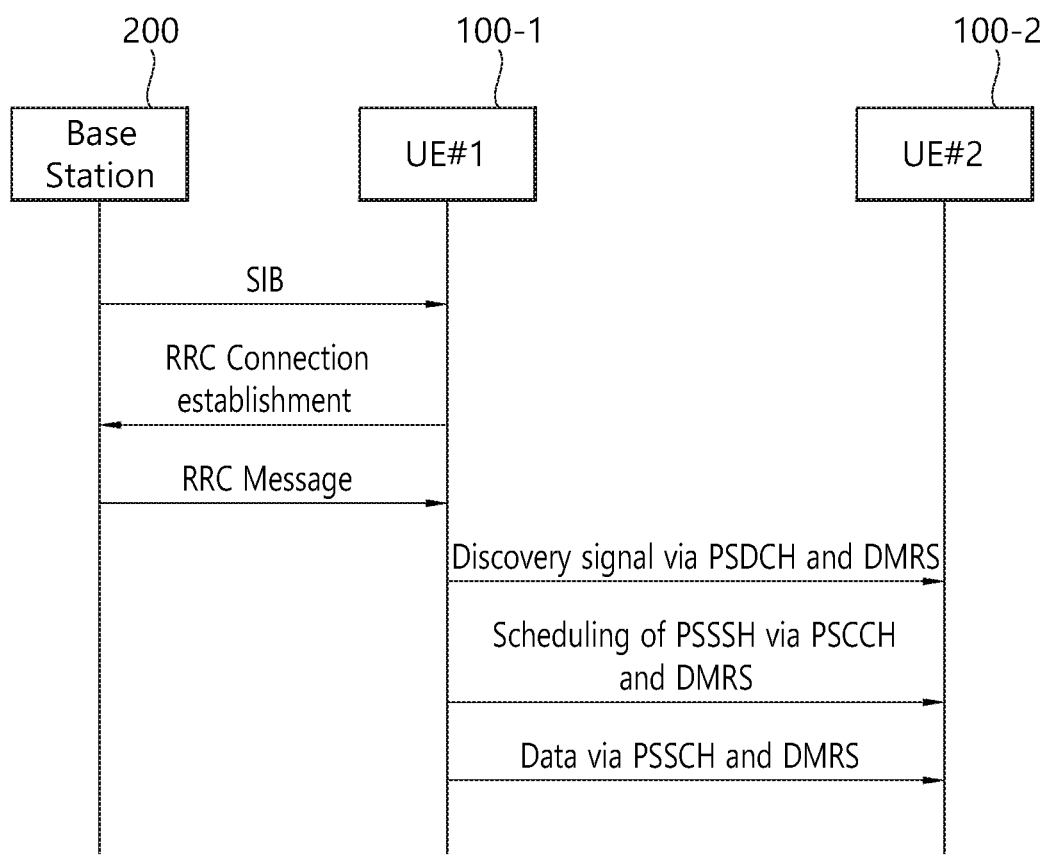
FIG. 8 shows an example of D2D communication or ProSe communication between UE#1 and UE#2 shown in FIG. 7.

In order to reflect the aforementioned needs, as shown in FIG. 8, a scheme for direct communication between UE#1 100-1, UE#2 100-2, and UE#3 100-3 or between UE#4 100-4, UE#5 100-5, and UE#6 100-6 without the intervention of an eNodeB (eNB) 200 is being discussed. The UE#1 100-1 and the UE#4 100-4 may directly communicate with each other with the help of the base station 200. The UE#4 100-4 may play the role of a relay node for the UE#5 100-5 and the UE#6 100-6. Likewise, the UE#1 100-1 may play the role of a relay node for the UE#2 100-2 and the UE#3 100-3 which are located far from the center of a cell.

D2D communication is also called a proximity service (ProSe). Furthermore, UE that performs a ProSe is also called ProSe UE. Furthermore, a link between pieces of UE used for the D2D communication is also called a sidelink. A frequency band which may be used in the sidelink is as follows.

TABLE 3

| Sidelink band | E-UTRA band | Transmission $F_{UL\_low}$-$F_{UL\_high}$ | Reception $F_{DL\_low}$-$F_{DL\_high}$ | Duplex mode |
|---|---|---|---|---|
| 2 | 2 | 1850 MHz-1910 MHz | 1850 MHz-1910 MHz | HD |
| 3 | 3 | 1710 MHz-1785 MHz | 1710 MHz-1785 MHz | HD |
| 4 | 4 | 1710 MHz-1755 MHz | 1710 MHz-1755 MHz | HD |
| 7 | 7 | 2500 MHz-2570 MHz | 2500 MHz-2570 MHz | HD |
| 14 | 14 | 788 MHz-798 MHz | 788 MHz-798 MHz | HD |
| 20 | 20 | 832 MHz-862 MHz | 832 MHz-862 MHz | HD |
| 26 | 26 | 814 MHz-849 MHz | 814 MHz-849 MHz | HD |
| 28 | 28 | 703 MHz-748 MHz | 703 MHz-748 MHz | HD |
| 31 | 31 | 452.5 MHz-457.5 MHz | 452.5 MHz-457.5 MHz | HD |
| 41 | 41 | 2496 MHz-2690 MHz | 2496 MHz-2690 MHz | HD |

Physical channels used in the sidelink are as follows.

A physical sidelink shared channel (PSSCH)

A physical sidelink control channel (PSCCH)

A physical sidelink discovery channel (PSDCH)

A physical sidelink broadcast channel (PSBCH)

Furthermore, physical signals used in the sidelink are as follows.

A demodulation reference signal (DMRS)

A sidelink sync signal (SLSS)

The SLSS includes a primary sidelink sync signal (PSLSS) and a secondary sidelink sync signal (SSLSS).

FIG. 8 shows an example of D2D communication or ProSe communication between UE#1 and UE#2 shown in FIG. 7.

Referring to FIG. 8, the base station 200 broadcasts a system information block (SIB) to the cell.

The SIB may include information about a resource pool related to D2D communication. The information about a resource pool related to D2D communication may be divided into an SIB type 18 and an SIB type 19.

The SIB type 18 may include resource configuration information for D2D communication. Furthermore, the SIB type 19 may include resource configuration information for D2D discovery.

The SIB type 19 includes discSyncConfig as follows.

TABLE 4

| SIB type 19 |
|---|
| discSyncConfig Indicates a configuration regarding whether UE is permitted to receive or transmit sync information. A base |

TABLE 4-continued

SIB type 19 station (E-UTRAN) may configure discSyncConfig when UE attempts to send sync information using dedicated signaling.

The discSyncConfig includes SL-SyncConfig. The SL-SyncConfig includes configuration information for the reception of an SLCC and the transmission of an SLSS as in the following table.

TABLE 5

| | Description of an SL-SyncConfig field |
|---|---|
| discSyncWindow | It is also called a searching window. It indicates a sync window that UE expects an SLSS. The value may be set to w1 or w2. The value w1 indicates 5 milliseconds, and the value w2 corresponds to a length obtained by dividing a normal CP by 2. |
| syncTxPeriodic | It indicates whether UE sends an SLSS once or periodically (e.g., every 40 ms) within each period of a discovery signal transmitted by the UE. In the case of periodical transmission, UE also sends MasterInformationBlock-SL. |
| syncTxThreshIC | It indicates a threshold value used in coverage. If an RSRP value measured with respect to counterpart UE (recognized like a cell) selected for sidelink communication is lower than the threshold value, UE may send an SLCC for sidelink communication with the counterpart UE. |
| txParameters | It includes the parameter of a configuration for transmission. |

The UE#1 100-1 located in coverage of the base station 200 establishes RRC connection with the base station 200.

Furthermore, the UE#1 100-1 receives an RRC message, for example, an RRC Connection Reconfiguration message from the base station 200. The RRC message includes a discovery configuration (hereinafter referred to as "discConfig"). The discConfig includes configuration information about a discover resource pool (hereinafter referred to as "DiscResourcePool"). The DiscResourcePool includes information listed in the following table.

TABLE 6

| | DiscResourcePool |
|---|---|
| discPeriod | It may also be indicated as a discovery period and may also be called a PSDCH period, that is, the period of a resource allocated within a cell for the transmission/reception of a discovery message. The value may be rf32, rf64, rf128, rf256, rf512, or rf1024. Such a value indicates the number of radio frames. That is, when the value is rf32, it indicates 32 radio frames. |
| numRepetition | It indicates a number value that subframeBitmap to be mapped to a subframe generated within the discPeriod is repeated. A base station configures the numRepetition and the subframeBitmap so that the mapped subframe does not exceed the discPeriod. |
| TF-ResourceConfig | It designates a set of time/frequency resources used for sidelink communication. |

The TF-ResourceConfig includes information listed in the following table.

TABLE 7

| SL-TF-ResourceConfig-r12 ::= | SEQUENCE { |
|---|---|
| prb-Num-r12 | INTEGER (1..100), |
| prb-Start-r12 | INTEGER (0..99), |
| prb-End-r12 | INTEGER (0..99), |
| offsetIndicator-r12 | SL-OffsetIndicator-r12, |
| subframeBitmap-r12 | SubframeBitmapSL-r12 |
| } | |

The SubframeBitmapSL is the same listed in the following table.

TABLE 8

| SubframeBitmapSL | It may also be indicated as discoverySubframeBitmap and designates a subframe bitmap indicative of a resource used in a sidelink. The value may be designated as bs4, bs8, bs12, bs16, bs30, bs40 or bs40. For example, the value bs40 means a bit string length of 40. |
|---|---|

The SL-OffsetIndicator includes information listed in the following table.

TABLE 9

| SL-OffsetIndicator | It may also be indicated as discoveryOffsetIndicator and indicates an offset of the first period of a resource pool within an SFN cycle. |
|---|---|
| SL-OffsetIndicatorSync | It may also be indicated as SyncOffsetIndicator and indicates a relation between SFNs and a subframe included in a sync resource according to an equation. (SFN * 10 + Subframe Number) mod 40 = SL-OffsetIndicatorSync. |

In order for the UE#1 100-1 to discover suitable UE nearby for D2D communication or ProSe communication or in order for the UE#1 100-1 to provide notification of its presence, it may send a discovery signal through a PSDCH.

Furthermore, the UE#1 100-1 may send scheduling assignment (SA) through a PSCCH. Furthermore, the UE#1 100-1 may send a PSSCH including data based on the scheduling assignment (SA).

<Vehicle-to Everything (V2X)>

The contents regarding D2D may also be applied to vehicle-to-everything (V2X).

The frequency bands that may be used for the V2X side link are as follows:

TABLE 10

| Side link band | E-UTRA band | Transmission FUL_low-FUL_high | reception FDL_low-FDL_high | Duplex mode |
|---|---|---|---|---|
| 47 | 47 | 5855 MHz 5925 MHz | 5855 MHz 5925 MHz | TDD |
| 3 | 3 | 1710 MHz-1785 MHz | 1805 MHz-1880 MHz | FDD |
| 7 | 7 | 2500 MHz-2570 MHz | 2620 MHz-2690 MHz | FDD |
| 8 | 8 | 880 MHz-915 MHz | 925 MHz-960 MHz | FDD |
| 39 | 39 | 1880 MHz-1920 MHz | 1880 MHz-1920 MHz | TDD |
| 41 | 41 | 2496 MHz 2690 MHz | 2496 MHz 2690 MHz | TDD |

V2X collectively refers to communication technologies with vehicle via all kinds of interfaces. The implementations of V2X may be as follows.

Figure 9:
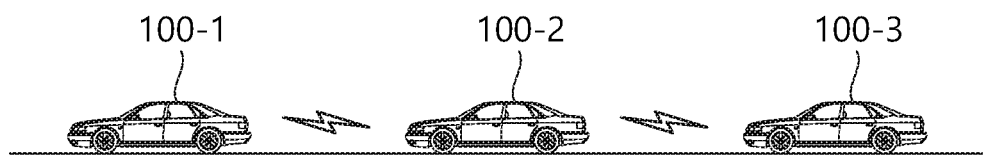
FIG. 9 is an exemplary diagram showing the concept of V2X.

FIG. 9 is an exemplary diagram showing the concept of V2X.

As may be seen with reference to FIG. 9, vehicles (i.e., radio devices 100-1, 100-2, and 100-3 mounted on the vehicles) may perform mutual communication. In V2X, "X" may be a vehicle. In this case, V2X may be indicated as vehicle-to-vehicle (V2V) and may mean communication between vehicles.

Meanwhile, in V2X, "X" may mean a person or a pedestrian. In this case, V2X may be indicated as a vehicle-to-person or vehicle-to-pedestrian (V2P). In this case, the pedestrian is not necessarily limited to a person who walks, but may include a person who rides a bicycle and a driver or passenger on a (specific speed or less) vehicle.

Alternatively, "X" may mean an infrastructure/network. In this case, V2X may be indicated as vehicle-to-infrastructure (V2I) or a vehicle-to-network (V2N), and may mean communication between a vehicle and a roadside unit (RSU) or between a vehicle and a network. The RSU may be traffic-related infrastructure, for example, a device that provides notification of speed. The RSU may be implemented in a base station or fixed UE.

From among various implementation examples of V2X, an implementation example of V2V communication is described below. There is a good possibility that a vehicle may be located in a shadow area in coverage of a base station or may be located out of the coverage of the base station.

However, there is a problem in that the existing 3GPP standard is not suitable for an implementation example of V2V communication because D2D UE is synchronized with time sync based on a sync signal (i.e., the time of a downlink subframe) from a base station in the existing 3GPP standard. In order to solve the problem, a signal from a satellite may be used as a sync signal for V2V communication. This is described with reference to FIG. 10.

Figure 10:
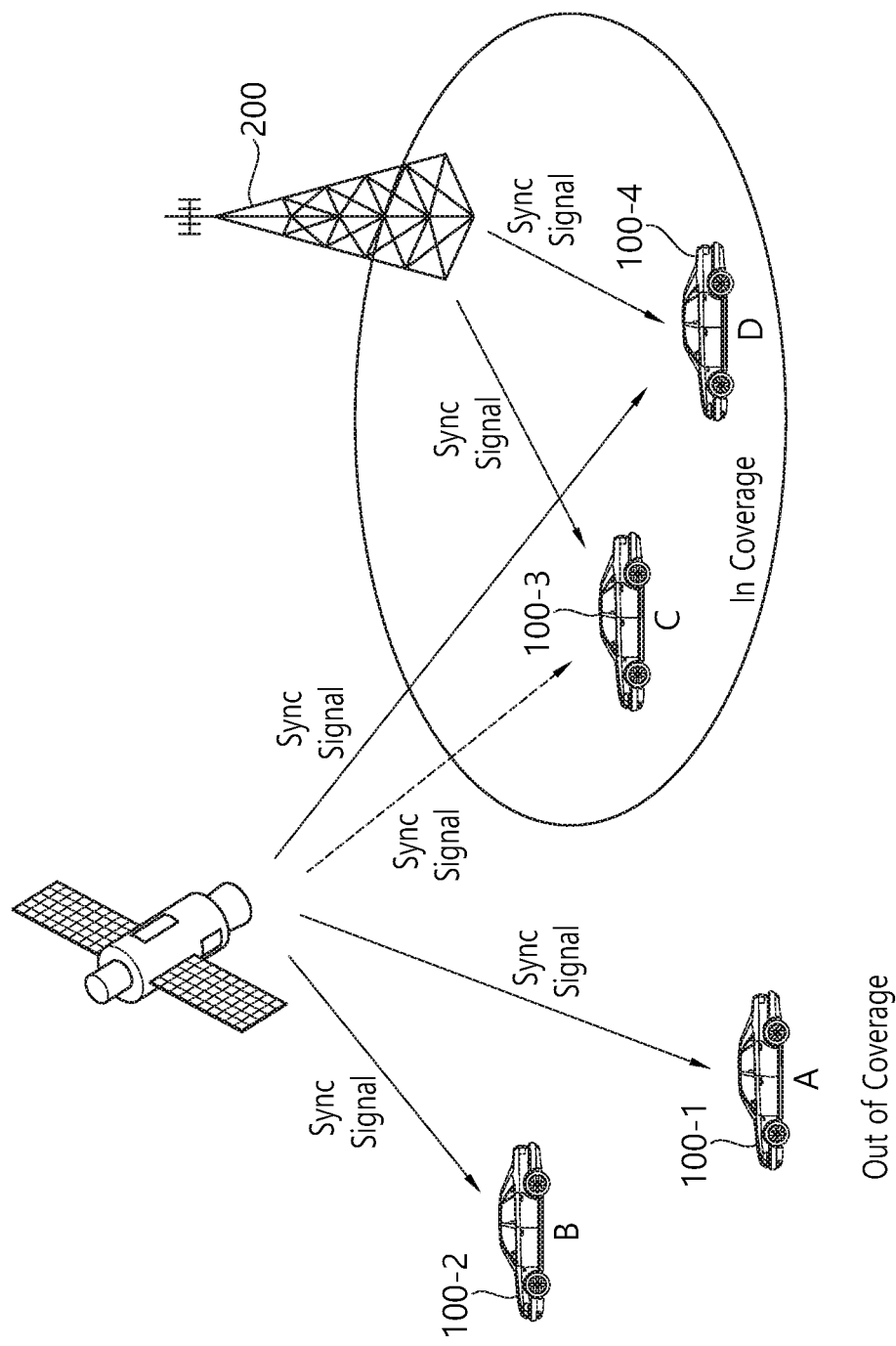
FIG. 10 is an exemplary diagram showing an example in which a signal from a satellite is used as a sync signal for V2X communication.

FIG. 10 is an exemplary diagram showing an example in which a signal from a satellite is used as a sync signal for V2X communication.

Referring to FIG. 10, V2X UE C 100-3 and V2X UE D 100-4 are present in coverage (IC) of a base station 200, and V2X UE A 100-1 and V2X UE B 100-2 are present out of coverage (OoC) of the base station. Furthermore, the V2X UE A 100-1, the V2X UE B 100-2, and the V2X UE D 100-4 may receive a signal from the satellite.

The V2X UE A 100-1 and the V2X UE B 100-2 are unable to receive a sync signal from the base station because they are located out of coverage of the base station, but are able to receive the signal from the satellite. Accordingly, the V2X UE A 100-1 and the V2X UE B 100-2 may use the signal from the satellite as a sync signal for V2X communication. The signal from the satellite may be a global positing system (GPS) signal or a global navigation satellite system (GNSS) signal, for example.

At this time, a problem may arise if the sync signal from the base station and the sync signal from the satellite system (e.g., GNSS) are not synchronized with each other in a temporal manner. For example, if the wireless device supporting both of Wide Area Network (WAN) communication and V2X communication is using the sync signal from the satellite system (e.g., GNSS) as a sync signal, the WAN communication and V2X communication may overlap based on the DFN offset for transmission via V2X communication based on the difference between the sync signal from the satellite system (e.g., GNSS) and the sync signal from the base station. At this time, a protocol allowing the wireless device to drop one of transmissions via the two overlapping communications may be required.

<The Present Disclosure>

Accordingly, to solve the problem described above, the present disclosure discloses a method of dropping one of transmissions via the two overlapping communications based on priority between the WAN communication and V2X communication when the WAN communication and V2X communication are overlapped with each other based on the DFN offset.

<Timing Misalignment Between WAN and GNSS>

When a signal from a base station (eNB) is used as a synchronization signal, a boundary of a direct frame number (DFN)-based subframe may be aligned with a boundary of a system frame number (SFN)-based subframe. However, when a signal from the GNSS is used as a synchronization signal, the boundary of the DFN-based subframe may not be aligned with the boundary of the SFN-based subframe. This misalignment is based on the DFN offset. Further, based on the priority between the WAN and the V2X and the DFN offset, the operations of the wireless device may vary. The DFN offset has a range of 0 to 1 ms and may be a positive number.

In this disclosure, the applicant discusses a shared transmission chain (shared Tx chain) used for V2X communication on a WAN shared carrier.

When, in the shared transmission chain, WAN uplink transmission and V2X transmission are scheduled to be performed in the same subframe, and the WAN uplink transmission has a higher priority than the V2X transmission, the wireless device should drop the lower ranked V2X transmission in the same subframe. Conversely, if the V2X transmission has a higher priority than the WAN uplink transmission, the wireless device should drop the WAN transmission with a lower priority in the same subframe.

The dropping in the subframe is related to the DFN offset. Based on the DFN offset, the subframe in which the WAN uplink is transmitted may not match the subframe in which the V2X is transmitted.

In the present disclosure, it is assumed that the V2X transmission is scheduled to be performed in the (N−1)-th subframe and the WAN transmission is scheduled to be performed in the N-th subframe for the shared transmission chain.

When the WAN uplink transmission has a higher priority than the V2X transmission, the last symbol of the V2X subframe is punctured and thus, is not actually transmitted. Thus, if the length of the DFN offset is smaller than or equal to the length of the last symbol (symbol #13) of the V2X subframe, there is no need to drop the V2X transmission in the (N−1)-th subframe. To the contrary, if the length of the DFN offset is greater than the length of the last symbol (symbol #13) of the V2X subframe, the V2X transmission in the (N−1)-th subframe should be dropped.

On the contrary, when the V2X transmission has a higher priority than the WAN uplink transmission, and the DFN offset length is smaller than or equal to the length of the last symbol (symbol #13) of the V2X subframe, there is no need to drop the WAN uplink transmission in the N-th subframe. On the contrary, if the length of the DFN offset is greater than the length of the last symbol (symbol #13) of the V2X subframe, the WAN uplink transmission in the N-th subframe should be dropped.

Based on the foregoing, the present disclosure provides the following suggestions:

Suggestion 1: when the wireless device has a shared transmission chain for V2X on a shared carrier, and WAN uplink transmission has higher priority than V2X transmission, and the WAN uplink transmission is scheduled to be performed in the N-th subframe, and if the length of the DFN offset is greater than the length of the last symbol (symbol #13) of the V2X subframe, the wireless device drops V2X transmission (i.e., V2X transmission in the (N−1)-th subframe) scheduled to be performed in a subframe immediately before the N-th subframe. However, if the length of the DFN offset is smaller than or equal to the length of the last symbol (symbol #13) of the V2X subframe, the wireless device does not drop the V2X transmission (i.e., the V2X transmission in the (N−1)-th subframe) scheduled to be performed in the subframe immediately before the N-th subframe.

Suggestion 2: when the wireless device has a shared transmission chain for V2X on a shared carrier, and V2X transmission has higher priority than WAN uplink transmission, and the V2X transmission is scheduled to be performed in the (N−1)-th subframe, and if the length of the DFN offset is greater than the length of the last symbol (symbol #13) of the V2X subframe, the wireless device must drop the WAN uplink transmission (i.e., WAN uplink transmission in the N-th subframe) scheduled to be performed in the subframe immediately after the (N−1)-th subframe. However, if the length of the DFN offset is smaller than or equal to the length of the last symbol (symbol #13) of the V2X subframe, the wireless device does not drop the WAN uplink transmission (i.e., WAN uplink transmission in the N-th subframe) scheduled to be performed in the subframe immediately after the (N−1)-th subframe.

<Interruption of V2X Transmission>

When the wireless device for V2X communication operates using multi carrier components (MCC), the V2X wireless device may have a dedicated reception chain (dedicated Rx chain) and a dedicated transmission chain (dedicated Tx chain). When the wireless device for V2X communication operates using a single carrier component (SCC), the V2X wireless device may have a dedicated reception chain and a shared transmission chain.

When the wireless device is operating using the MCC, the wireless device may not perform WAN uplink transmission using a dedicated transmission chain due to power shortage even when WAN uplink transmission and V2X transmission are scheduled to be performed simultaneously.

In this connection, if the power set for V2X transmission is greater than the maximum power set for WAN uplink transmission, and if V2X transmission has higher priority than WAN uplink transmission, the wireless device may drop a WAN uplink transmission.

On the contrary, if the power set for WAN uplink transmission is greater than the maximum power set for V2X transmission, and if the WAN uplink transmission has a higher priority than the V2X transmission, the wireless device may drop the V2X transmission.

If for the dedicated transmission chain, no priority is set between the WAN uplink transmission and the V2X transmission, and if a total power for the dedicated transmission chain is greater than a lower power among the maximum power for the V2X transmission and the maximum power for the WAN uplink transmission, the wireless device first allocates the lower power to the dedicated transmission chain, and then allocates the remaining power to another transmission chain so that the wireless device does not drop any transmissions. However, if the priority between V2X and WAN transmissions is not set and the wireless device drops any of the two transmissions, there may be problem in terms of scheduling.

The transmission dropping occurs in the boundary of the subframe. When a signal from GNSS is used as a sync signal, misalignment between the sync signals from the GNSS and the base station may affect a subframe in which transmission is dropped. The DFN offset may affect the misalignment between the sync signals from the GNSS and the base station, and may range from 0 to 1 ms.

If the last symbol for the V2X transmission is punctured, the power set for the last symbol in the V2X transmission is not included in the total power for V2X transmission and WAN uplink transmission.

By considering the transmission priority, the set power, the DFN offset, and whether the last symbol for the V2X transmission is punctured, dropping by the wireless device using the dedicated transmission channel and using the MCC may be suggested as follows:

Suggestion 1: for dropping WAN uplink transmission or dropping V2X transmission, the wireless device must consider the interruption requirements for both the dedicated transmission chain and the shared transmission chain.

Suggestion 2: When the wireless device operates using the MCC, the following interruption requirements must be considered.

Priority of V2X transmission>Priority of WAN uplink transmission
Power for V2X transmission≥Maximum power for the wireless device
WAN uplink transmission scheduled to be performed in a subframe overlapping a subframe for V2X transmission is dropped.
However, if DFN offset≤the length of the last symbol for the V2X transmission, the WAN transmission in the WAN uplink subframe corresponding to an ending subframe for the V2X transmission is not dropped.
The sum of the V2X transmission power and the WAN uplink transmission power≤the maximum power for the wireless device
No WAN transmission interruption
Priority of V2X transmission<Priority of WAN uplink transmission
Power for WAN uplink transmission≥Maximum power for the wireless device
V2X transmission scheduled to be performed in a subframe overlapping a subframe for WAN uplink transmission is dropped.
However, if DFN offset≤the length of the last symbol for the V2X transmission, the V2X transmission in the V2X subframe corresponding to a starting subframe for the WAN uplink transmission is not dropped.
The sum of the V2X transmission power and the WAN uplink transmission power≤the maximum power for the wireless device
No WAN transmission interruption Suggestion 3: When the wireless device is operating using the SCC, the following interruption requirements should be considered:

Priority of V2X transmission>Priority of WAN uplink transmission
WAN uplink transmission scheduled to be performed in a subframe overlapping a subframe for V2X transmission is dropped.
However, if DFN offset≤the length of the last symbol for the V2X transmission, the WAN transmission in the WAN uplink subframe corresponding to an ending subframe for the V2X transmission is not dropped.
Priority of V2X transmission<Priority of WAN uplink transmission V2X transmission scheduled to be performed in a subframe overlapping a subframe for WAN uplink transmission is dropped.

However, if DFN offset≤the length of the last symbol for the V2X transmission, the V2X transmission in the V2X subframe corresponding to a starting subframe for the WAN uplink transmission is not dropped.

When following the above Suggestions, the base station or eNB needs to know, for proper scheduling, when the wireless device will drop the WAN uplink transmission.

In the following, the Suggestions as described above will be described in details using the drawings.

Figure 11A:
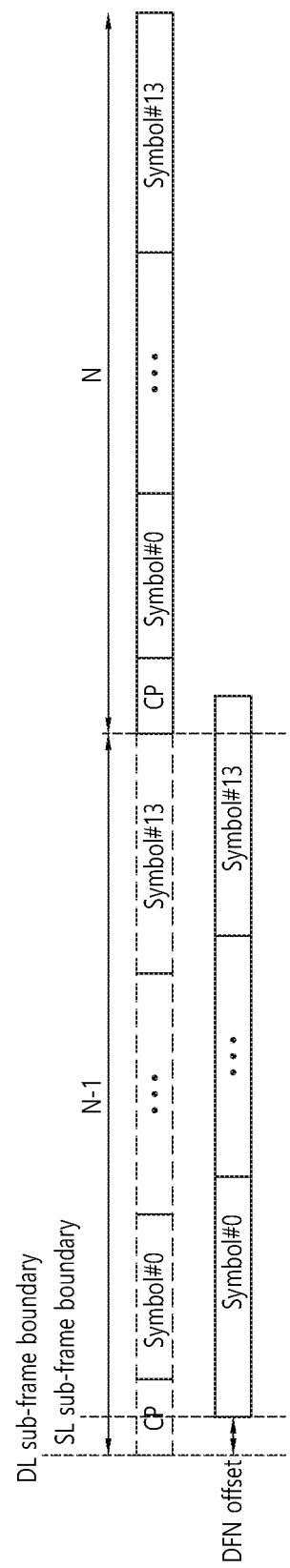
FIG. 11A to FIG. 11C illustrate an example where WAN communication and V2X communication overlap based on a length of a DFN offset, in accordance the present disclosure.
Figure 11B:
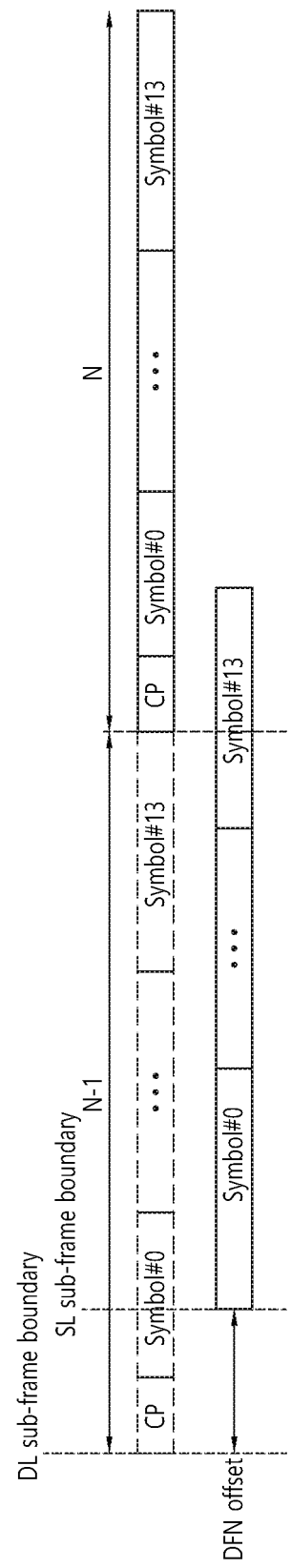
Figure 11C:
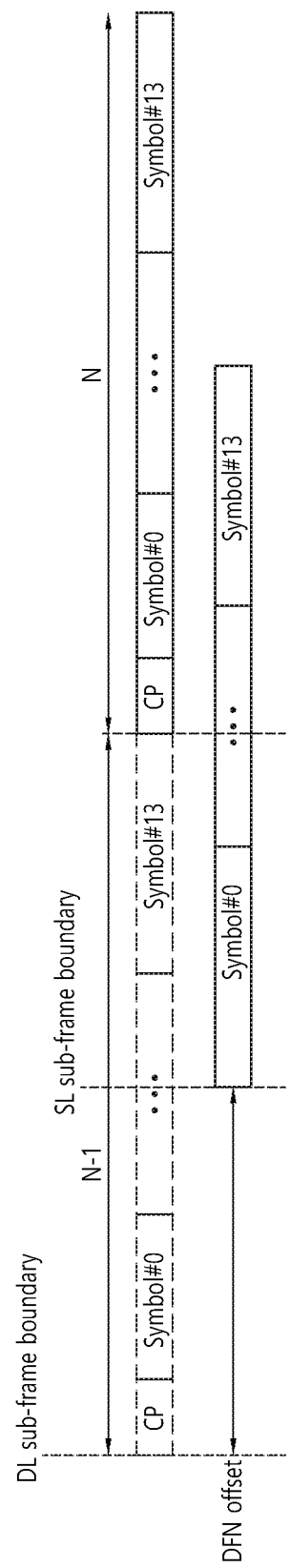

FIG. 11A to FIG. 11C illustrate an example where WAN communication and V2X communication overlap based on a length of a DFN offset, in accordance the present disclosure.

FIG. 11A shows a case where the length of the DFN offset is smaller than the cyclic prefix (CP) for the WAN transmission; FIG. 11B shows a case where the DFN offset length is larger than the CP length for the WAN transmission and smaller than the symbol length; and FIG. 11C shows a case where the length of the DFN offset is larger than the length of the symbol.

With reference to the Suggestions as described above, FIG. 11A and FIG. 11B correspond to the Suggestions where the length of the DFN offset is smaller than or equal to the length of the last symbol of the V2X subframe; and FIG. 11C may correspond to the Suggestion where the length of the DFN offset is larger than the length of the last symbol of the V2X subframe.

Figure 12A:
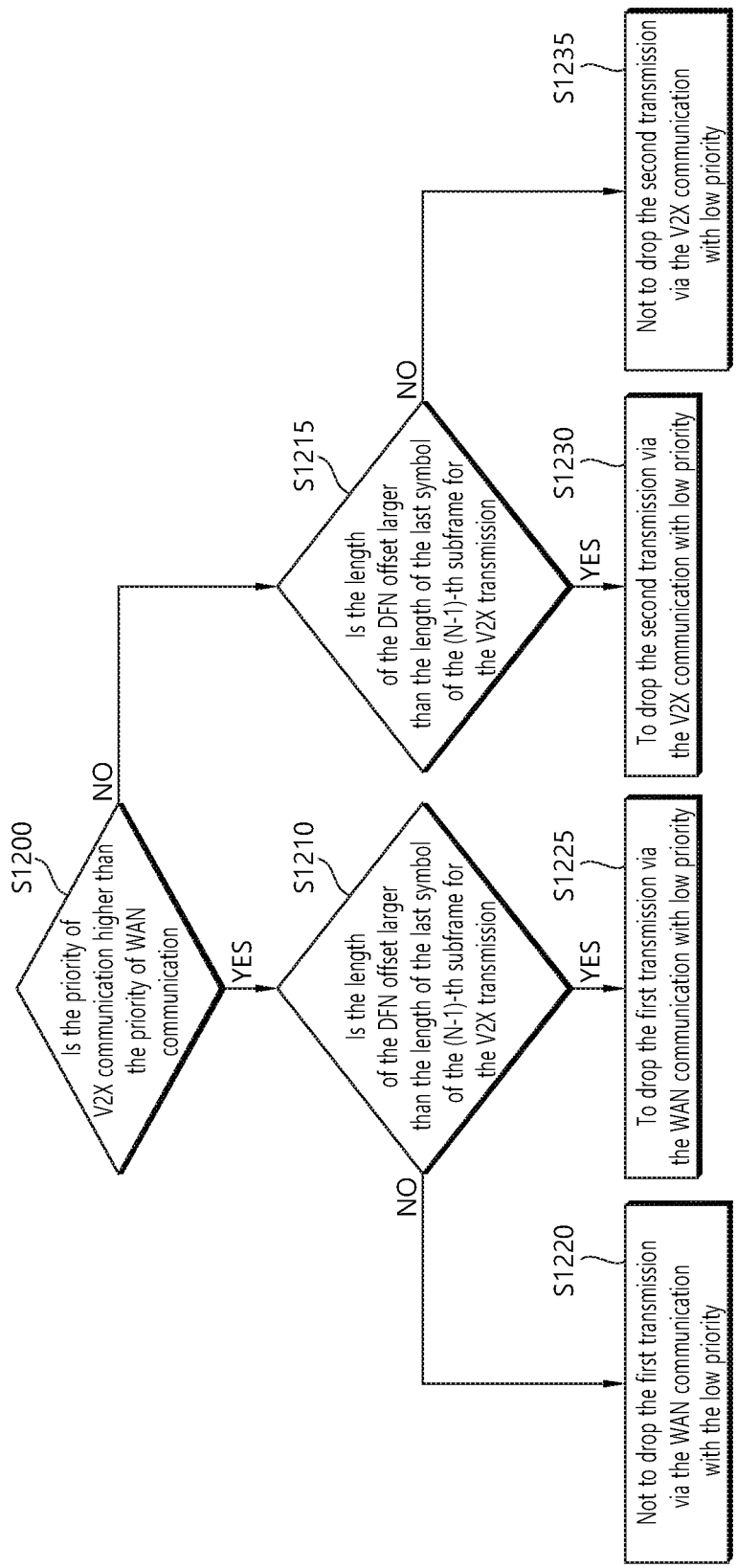
FIG. 12A to FIG. 12C illustrate a method of dropping a low priority transmission between transmissions via WAN communication and V2X communication according to an embodiment of the present disclosure.
Figure 12B:
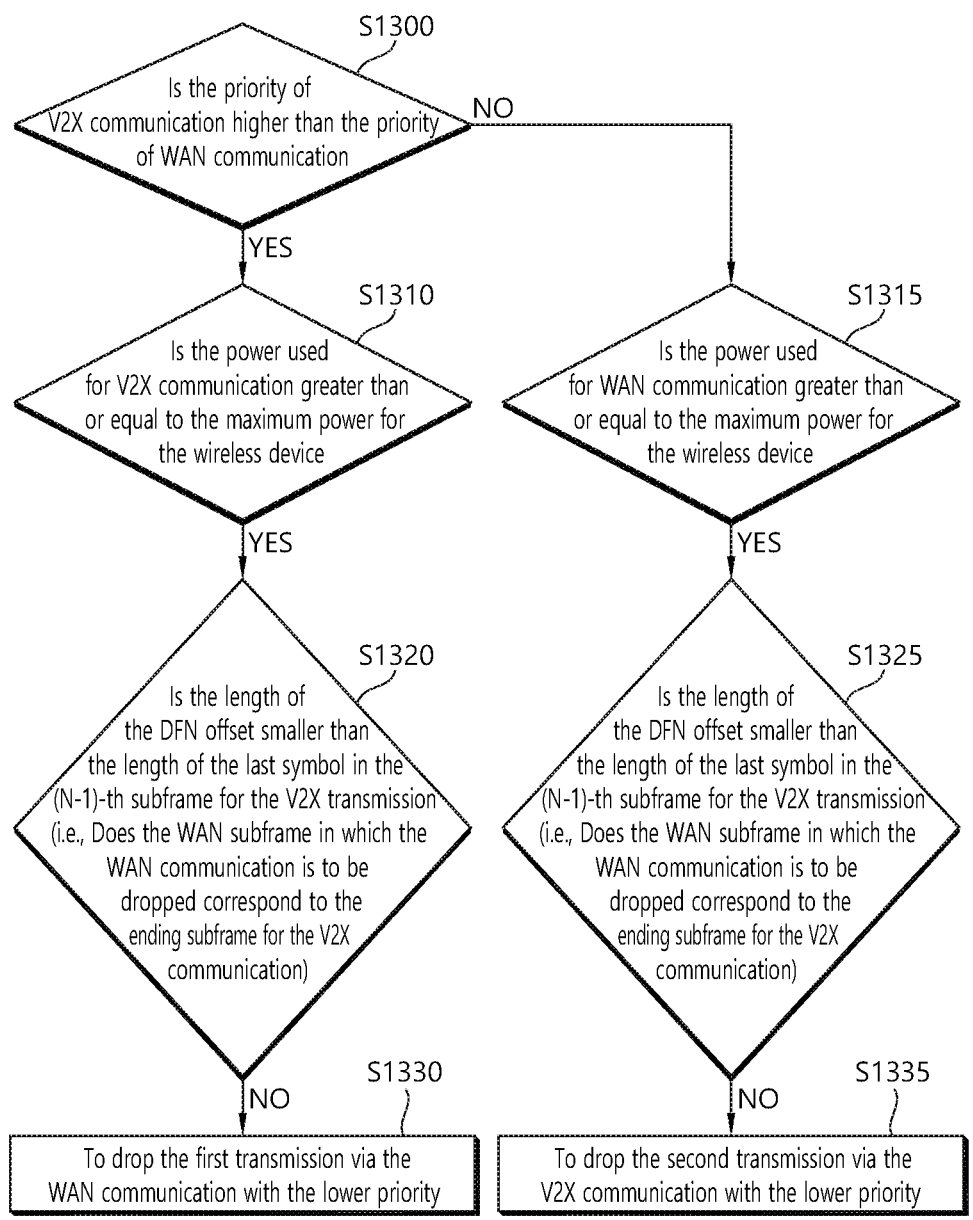
Figure 12C:
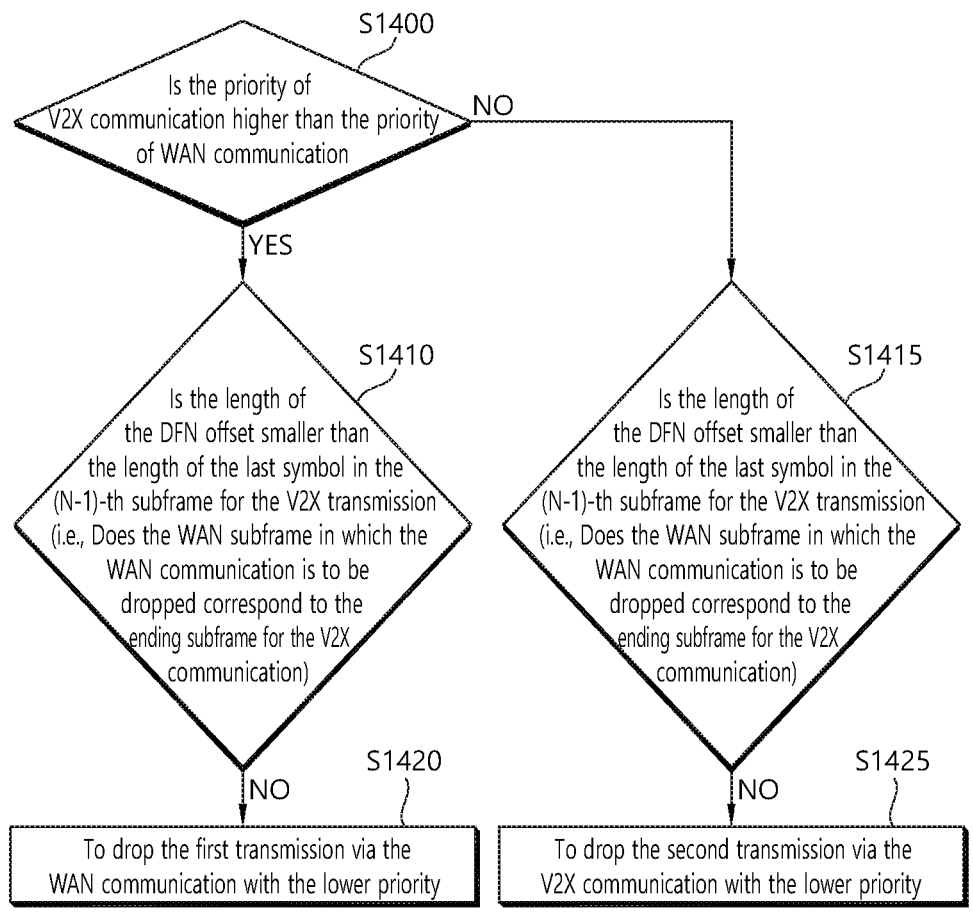

FIG. 12A to FIG. 12C illustrate a method of dropping a low priority transmission between transmissions via WAN communication and V2X communication according to an embodiment of the present disclosure.

In FIG. 12A to 12C, the following assumption is made: a first transmission via the WAN communication is scheduled to be performed in the N-th subframe, and a second transmission via the V2X communication is scheduled to be performed in the (N−1)-th subframe.

Referring to FIG. 12A, if the priority of V2X communication is higher than the priority of WAN communication (YES in S1200) and if the length of the DFN offset is larger than the length of the last symbol of the (N−1)-th subframe for the V2X transmission (YES in S1210), the first transmission and the second transmission overlap each other. Accordingly, the wireless device may drop the first transmission via the WAN communication with low priority (S1225). To the contrary, if the length of the DFN offset is smaller than or equal to the length of the last symbol of the (N−1)-th subframe for the V2X transmission (NO in S1210), the first transmission and the second transmission do not overlap each other. Therefore, the V2X wireless device may not drop the first transmission via the WAN communication with the low priority (S1220).

Further, when the priority of V2X communication is lower than the priority of WAN communication (NO in S1200), and if the length of the DFN offset is larger than the length of the last symbol of the (N−1)-th subframe for the V2X transmission (YES in S1215), the first transmission and the second transmission overlap each other. Thus, the wireless device may drop the second transmission via the V2X communication with low priority (S1230). To the contrary, if the length of the DFN offset is smaller than or equal to the length of the last symbol of the (N−1)-th subframe for the V2X transmission (NO in S1215), the V2X wireless device may not drop the second transmission via the V2X communication with low priority (S1235) since the first transmission and the second transmission do not overlap with each other.

FIG. 12B shows a method of dropping communication having low priority among WAN communication and V2X communication using the dedicated transmission chain (dedicated Tx chain) when the wireless device operates using the MCC.

Referring to FIG. 12B, when the priority of V2X communication is higher than the priority of WAN communication (YES in S1300), and if the power used for V2X communication is greater than or equal to the maximum power for the wireless device (YES in S1310), and if the length of the DFN offset is not smaller than the length of the last symbol in the (N−1)-th subframe for the V2X transmission (i.e., the WAN subframe in which the WAN communication is to be dropped does not correspond to the ending subframe for the V2X communication) (NO in S1320), the wireless device may drop the first transmission via the WAN communication with the lower priority (S1330). That is, if the priority of V2X communication is higher than the priority of WAN communication and the power used for V2X communication is greater than or equal to the maximum power for the wireless device, the wireless device may drop the low priority WAN communication overlapping with the high priority V2X communication.

To the contrary, referring to FIG. 12B, when the priority of V2X communication is lower than the priority of WAN communication (No in S1300), and if the power used for WAN communication is greater than or equal to the maximum power for the wireless device (YES in S1315), and if the length of the DFN offset is not smaller than the length of the last symbol in the (N−1)-th subframe for the V2X transmission (i.e., the V2X subframe in which the V2X communication is to be dropped does not correspond to the starting subframe for the WAN communication) (NO in S1325), the wireless device may drop the second transmission via the V2X communication with the lower priority (S1335). That is, if the priority of V2X communication is lower than the priority of WAN communication and the power used for WAN communication is greater than or equal to the maximum power for the wireless device, the wireless device may drop the low priority V2X communication overlapping with the high priority WAN communication.

FIG. 12C shows a method of dropping communication having low priority among WAN communication and V2X communication using the shared transmission chain (shared Tx chain) when the wireless device operates using the SCC.

Referring to FIG. 12C, when the priority of V2X communication is higher than the priority of WAN communication (YES in S1400), and if the length of the DFN offset is not smaller than the length of the last symbol in the (N−1)-th subframe for the V2X transmission (i.e., the WAN subframe in which the WAN communication is to be dropped does not correspond to the ending subframe for the V2X communication) (NO in S1410), the wireless device may drop the first transmission via the WAN communication with the lower priority (S1420). That is, if the priority of V2X communication is lower than the priority of WAN communication, the wireless device may drop the low priority WAN communication overlapping with the high priority V2X communication.

To the contrary, referring to FIG. 12C, when the priority of V2X communication is lower than the priority of WAN communication (No in S1400), and if the length of the DFN offset is not smaller than the length of the last symbol in the (N−1)-th subframe for the V2X transmission (i.e., the V2X subframe in which the V2X communication is to be dropped does not correspond to the starting subframe for the WAN communication) (NO in S1415), the wireless device may drop the second transmission via the V2X communication with the lower priority (S1425). That is, if the priority of V2X communication is lower than the priority of WAN communication, the wireless device may drop the low priority V2X communication overlapping with the high priority WAN communication.

The above mentioned embodiments of the present disclosure may be implemented by hardware.

Figure 13:
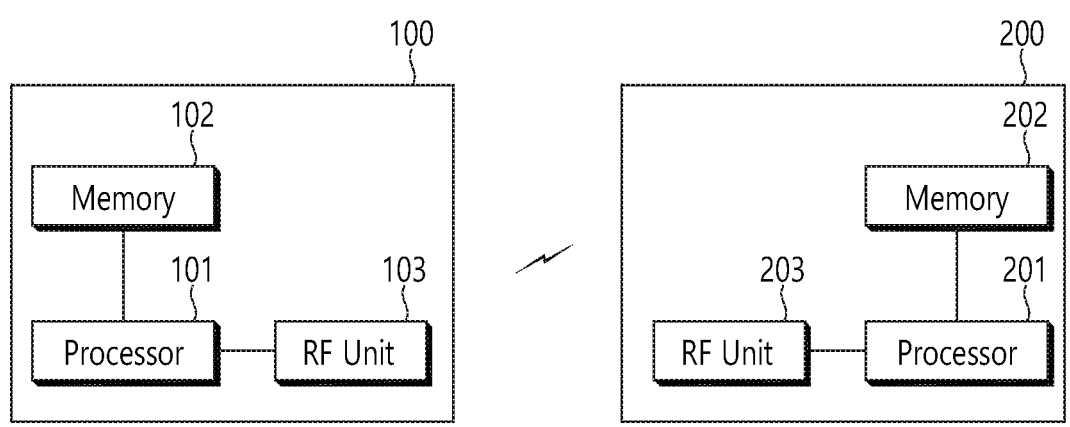
FIG. 13 is a block diagram showing a wireless communication system in which the disclosure of this specification is implemented.

FIG. 13 is a block diagram showing a wireless communication system in which the disclosure of this specification is implemented.

The base station 200 includes a processor 201, memory 202, and a radio frequency (RF) unit 203. The memory 202 is connected to the processor 201 and stores a variety of pieces of information for driving the processor 201. The RF unit 203 is connected to the processor 201 and sends and/or receives a radio signal. The processor 201 implements the proposed functions, processes and/or methods. In the aforementioned embodiments, the operation of the base station may be implemented by the processor 201.

The UE 100 includes a processor 101, memory 102, and an RF unit 103. The memory 102 is connected to the processor 101 and stores a variety of pieces of information for driving the processor 101. The RF unit 103 is connected to the processor 101 and sends and/or receives a radio signal. The processor 101 implements the proposed functions, processes and/or methods.

According to the disclosure of the present disclosure, the problem of the conventional technology described above may be solved.

The processor may include application-specific integrated circuits (ASICs), other chipsets, logic circuits and/or data processors. The memory may include read-only memory (ROM), random access memory (RAM), flash memory, memory cards, storage media and/or other storage devices. The RF unit may include a baseband circuit for processing a radio signal. When the aforementioned embodiment is implemented in software, the aforementioned scheme may be implemented into a module (process or function) that performs the above function. The module may be stored in the memory and executed by the processor. The memory may be placed inside or outside the processor and may be connected to the processor using a variety of well-known means.

In the above exemplary system, although the methods have been described based on the flowcharts in the form of a series of steps or blocks, the present disclosure is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the range of right of the present disclosure.

What is claimed is:

1. A method for transmitting data by a wireless device supporting both of wide area network (WAN) communication and V2X (vehicle-to-X) communication, the method comprises:

scheduling, by the wireless device, a first transmission to be performed in an N-th subframe,
wherein the N is an integer number equal to or greater than one, and wherein the first transmission is performed based on the WAN communication;

scheduling, by the wireless device, a second transmission to be performed in an (N−1)-th subframe, wherein the second transmission is performed based on the V2X communication, and wherein the (N−1)-th subframe for the second transmission overlaps with the N-th subframe for the first transmission, and wherein an end point of the (N−1)-th subframe for the second transmission is located after a start point of the N-th subframe for the first transmission by a DFN (Direct Frame Number) offset; and determining, by the wireless device, which one of the first transmission or the second transmission to be dropped, based on (i) a priority between the WAN communication and the V2X communication and (ii) a comparison between a length of a last symbol in the (N−1)-th subframe for the second transmission and a length of the DFN offset, wherein the second transmission is not dropped in the (N−1)-th subframe when the WAN communication has a higher priority than the V2X communication, and the length of the DFN offset is smaller than or equal to the length of the last symbol in the (N−1)-th subframe for the second transmission, and wherein the last symbol in the (N−1)-th subframe for the second transmission is a punctured symbol, which is not used for data transmission.

2. The method of claim 1, wherein the second transmission is dropped when the WAN communication has a higher priority than the V2X communication, and the length of the DFN offset is greater than the length of the last symbol in the (N−1)-th subframe for the second transmission.

3. The method of claim 1, wherein the first transmission is dropped when the V2X communication has a higher priority than the WAN communication, and the length of the DFN offset is greater than the length of the last symbol in the (N−1)-th subframe for the second transmission.

4. The method of claim 1, wherein the first transmission is not dropped when the V2X communication has a higher priority than the WAN communication, and the length of the DFN offset is smaller than or equal to the length of the last symbol in the (N−1)-th subframe for the second transmission.

5. The method of claim 1, wherein determining which one of the first transmission or the second transmission to be dropped is further based on comparison between a maximum power for the wireless device and a first power for the first transmission via the WAN communication or a second power for the second transmission via the V2X communication.

6. The method of claim 5, wherein the second transmission is dropped when the WAN communication has a higher priority than the V2X communication, and the length of the DFN offset is greater than the length of the last symbol in the (N−1)-th subframe for the second transmission.

7. The method of claim 6, wherein the first power for the first transmission via the WAN communication is greater than or equal to the maximum power for the wireless device.

8. The method of claim 5, wherein the first transmission is dropped when the V2X communication has a higher priority than the WAN communication, and the length of the DFN offset is greater than the length of the last symbol in the (N−1)-th subframe for the second transmission.

9. The method of claim 8, wherein the second power for the second transmission via the V2X communication is greater than or equal to the maximum power for the wireless device.

10. A wireless device configured to support both of wide area network (WAN) communication and V2X (vehicle-to-X) communication, wherein the device comprises:
- a transceiver configured to transmit data using the WAN communication and the V2X communication; and
- a processor operatively coupled to the transceiver, wherein the processor is configured to:
- schedule a first transmission to be performed in an N-th subframe,
- wherein the first transmission is performed based on the WAN communication, the N is an integer number equal to or greater than one;
- schedule a second transmission to be performed in an (N−1)-th subframe,
- wherein the second transmission is performed based on the V2X communication, and
- wherein the (N−1)-th subframe for the second transmission overlaps with the N-th subframe for the first transmission,
- wherein an end point of the (N−1)-th subframe for the second transmission is located after a start point of the N-th subframe for the first transmission by a DFN (Direct Frame Number) offset; and
- determine which one of the first transmission or the second transmission to be dropped, based on a priority between the WAN communication and V2X communication and (ii) a comparison between a length of a last symbol in the (N−1)-th subframe for the second transmission and a length of the DFN offset,
- wherein the second transmission is not dropped in the (N−1)-th subframe when the WAN communication has a higher priority than the V2X communication, and the length of the DFN offset is smaller than or equal to the length of the last symbol in the (N−1)-th subframe for the second transmission, and
- wherein the last symbol in the (N−1)-th subframe for the second transmission is a punctured symbol, which is not used for data transmission.

* * * * *